United States Patent [19]
Kunnas

[11] Patent Number: 6,064,004
[45] Date of Patent: May 16, 2000

[54] ELECTRICAL WIRING INSTALLATION APPARATUS AND METHOD

[75] Inventor: Richard E. Kunnas, Mansfield, Ohio

[73] Assignee: RGR Technologies, Inc, Mansfield, Ohio

[21] Appl. No.: 09/103,891

[22] Filed: Jun. 24, 1998

[51] Int. Cl.[7] .................................................... H02G 3/18
[52] U.S. Cl. ........................ 174/65 G; 174/152 G; 174/153 G; 16/2.1; 248/56
[58] Field of Search ............................... 174/65 G, 31 R, 174/151, 152 G, 153 G; 248/56; 16/2.1

[56] References Cited

U.S. PATENT DOCUMENTS

| | | |
|---|---|---|
| 2,396,836 | 3/1946 | Ellinwood . |
| 2,517,717 | 8/1950 | Rose . |
| 3,634,608 | 1/1972 | Buhl et al. . |
| 5,216,206 | 6/1993 | Maesako . |
| 5,254,808 | 10/1993 | Rodrigues et al. . |
| 5,343,669 | 9/1994 | Petri . |
| 5,422,436 | 6/1995 | Zachrai . |
| 5,448,012 | 9/1995 | Jacob . |
| 5,675,124 | 10/1997 | Stough et al. ........................ 174/65 G |
| 5,726,392 | 3/1998 | Farr et al. ............................. 174/65 G |
| 5,834,693 | 11/1998 | Waddell et al. ...................... 174/65 R |
| 5,837,936 | 11/1998 | Rogers et al. ........................ 174/65 R |
| 5,880,630 | 3/1999 | Strickley ................................ 174/135 |

FOREIGN PATENT DOCUMENTS

| | | | |
|---|---|---|---|
| 278544 | 8/1988 | European Pat. Off. ............. | 174/65 G |
| 905557 | 9/1961 | United Kingdom ................. | 174/65 G |
| 9101058 | 1/1991 | WIPO .................................. | 174/65 G |

*Primary Examiner*—Dean A. Reichard
*Assistant Examiner*—Dhiru R Patel
*Attorney, Agent, or Firm*—Daniel D. Wasil; David R. Percio

[57] ABSTRACT

A bushing (20) is placed in an aperture in an electrical box. Placement of a plurality of plugs (40) in the bushing leaves a plurality of interstices (30) through which wires may enter the electrical box. Interstices are selected to allow wires to feed straight into their connection point from outside the electrical box.

21 Claims, 4 Drawing Sheets

ELECTRICAL WIRING INSTALLATION APPARATUS AND METHOD

TECHNICAL FIELD

This invention relates to installation of electrical wiring. Specifically this invention relates to installation of electrical wiring through openings in electrical boxes, control panels, chassis sections and walls.

BACKGROUND ART

Electrical wires enter and exit a number of electrical boxes, control panels and walls as they carry electrical energy from source to load. The larger the load, the higher the rating of the equipment and the larger the wire must be to supply it. For 100-amp panels, which are generally the smallest in use, a #1 American Wire Gauge ("AWG") wire size could be used. For a 225-amp panel, #4/0 AWG would be required. While for a 600 amp panel 1000 kcmil wire would be required.

The physical route the wires follow necessitates bends in the wire at many locations. For example, an electrical circuit made up of a number of wires may run above a ceiling or through a wall until it reaches an electrical box containing circuit breakers, relays, controls or other devices. For electrical circuits passing through a wall or floor, the wires must often change direction before continuing along their route. To enter an electrical box the wires must change direction before reaching their connection point. In a three phase circuit having three or four wires, each wire has a different connection point.

Electrical wires are generally a single or multiple strand metallic conductor covered with a non-conducting material. Good engineering practice as well as governmental regulations limit how sharply a wire may be bent to prevent damage during operation. This limit is known as the minimum bending radius and is a multiple of the diameter of the wire. It should be noted that it is also physically difficult for a worker installing a wire having a larger conductor with a still insulation to make sharp bends.

The nominal diameter of a 1/0 AWG wire with insulation rated for 600 volts is slightly less than ½ inch. Its minimum bending radius is between approximately 2½ and 3½ inches. 1000 kcmil wire with insulation rated for 600 volts is slightly less than 1¼ inches and its minimum bending radius is between approximately 6½ and 9¼ inches.

When a wire enters an electrical box at the bottom and must then enter a connection point some distance laterally and upward in the box, the wire must make a first lateral bend and then at least one second bend upward into the connection point. Using the 1/0 AWG wire described above, the lateral bend will require at least 2.5 inches before the point where it must bend upward, and then requires at least another 2.5 inches for the upward bend. If, however, the wire can enter the box directly outside the connection point, it is not necessary to allow for the lateral distance required for the second bend. In the example, at least 2.5 inches less space is needed.

Short circuits, often called "faults" are known to occur in electrical systems. Typical small commercial businesses have to withstand 50,000 to 100,000 amperes, while a shopping center or small industrial facility would be twice as high. A sudden inrush of fault current can produce electromagnetic forces of sufficient magnitude to move the wires substantially if they are not properly restrained. Good engineering design practice takes into account how much wire movement would occur if a zero resistance short circuit, known as a "bolted fault" were to occur between one or more energized wires and ground or between two or more energized wires. Wires entering an electrical box or passing through a wall or floor must be restrained sufficiently to withstand the movement which would otherwise occur during a bolted fault.

Electrical panel boxes are generally manufactured of a metal, with a plurality of partially cut through openings or removable plugs, known as "knockouts". The knockouts have an approximately circular shape and are located around the sides and back of the boxes. Knockouts have historically had a generally circular shape due to tooling limitations for making other shapes. An appropriate knockout is removed to create an opening through which each electrical wire may pass for electrical connection to the enclosed electrical device. Once a knockout has been removed it cannot be reinstalled.

A knockout of approximately the size of an entering wire provides some restraint in the event of a fault. However, an additional concern arises when the phase wires enter an electrical panel box through separate knockouts. The electromagnetic fields which tend to cancel each other when the wires of multi-phase circuits are in proximity, do not do so when the individual phase wires are separated. Magnetic fields and eddy currents can be generated in the metal panel box wall. Their magnitude varies with the amount of current being carried in the wires.

Standard knockout locations frequently are not directly in line with the desired connection point of the electrical device enclosed within the box. Therefore one or more bends in the wire inside the electrical box must be made to route the wire from the knockout location to the connection point. In order to accommodate a variety of knockout locations as well as a variety of bending radii, electrical boxes are larger than would be required if wires could enter the box in a straight line into the connection point.

Thus there exists a need for a system and method for installation of electrical wiring into electrical boxes and through openings in control panels and walls, eliminating additional space requirements to accommodate wire bends due to nonaligned connection points and electrical box entry points. Smaller boxes increase the design options for architects and engineers for new installations as well as in electrical upgrades and retrofits for existing installations.

DISCLOSURE OF INVENTION

It is an object of the present invention to provide a system and method for installation of electrical wiring.

It is an object of the present invention to provide a system and method for installation of electrical wiring into an electrical box.

It is a further object of the present invention to provide a system and method for installation of electrical wiring into an electrical box.

It is a further object of the present invention to provide a system and method for feeding wires into an electrical box wherein the wires can feed straight in to their connection points.

It is a further object of the present invention to provide a system and method for feeding wires into an electrical box wherein the wires are restrained from movement under fault conditions.

It is a further object of the present invention to provide a system and method for feeding wires into an electrical box wherein magnetic fields and eddy currents are reduced between physically separated wires.

It is a further object of the present invention to provide a system and method for feeding wires into an electrical box which can also be used for feeding wires through control panels, walls or floors.

It is a further object of the present invention to provide a system and method for installing electrical wiring in an electrical box or through control panels, walls or floors which can be done quickly, efficiently, conveniently and economically.

Further objects of the present invention will be made apparent in the following Best Mode for Carrying Out Invention and the appended claims.

The foregoing objects are accomplished in a preferred embodiment of the invention by an electrical box having an elongated opening into which a bushing is inserted. The bushing has incrementally variable wire entry points. The elongated opening and bushing combination permit positioning wires outside the box for straight line entry into the connecting lugs or connection points they are directed toward. This straight line entry eliminates the space required to accommodate the minimum bending radius of the wire if bends must be made within the box. Plus are placed in the bushing in each location that is not filled by a wire in order to eliminate openings. Space required is limited to that needed for safe connection and handling of each wire.

BEST MODE FOR CARRYING OUT INVENTION

Figure 1:
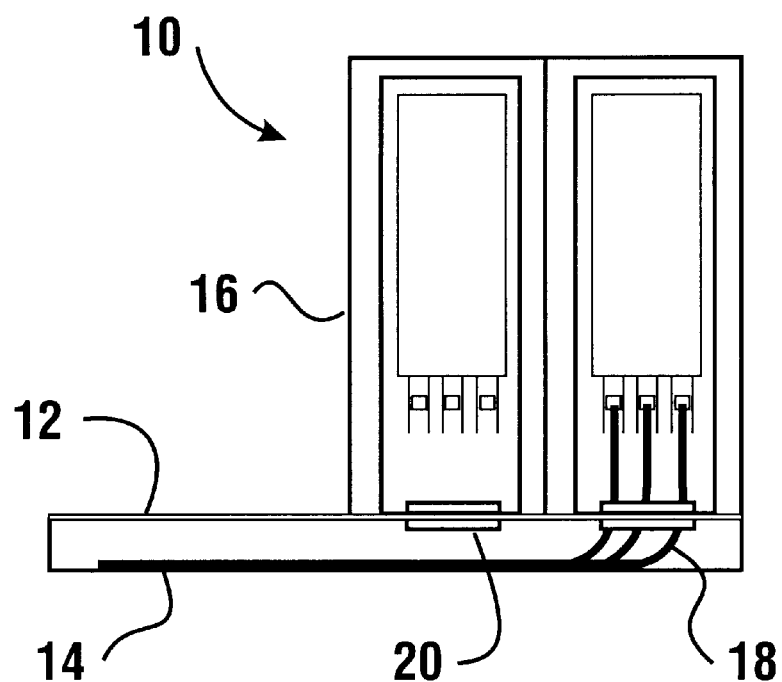
FIG. 1 is a front elevation of an assembly of two electrical boxes, and further showing wires entering one electrical box through a bushing of the present invention and a bushing installed in the base of an electrical box with no wires entering.
Figure 2:
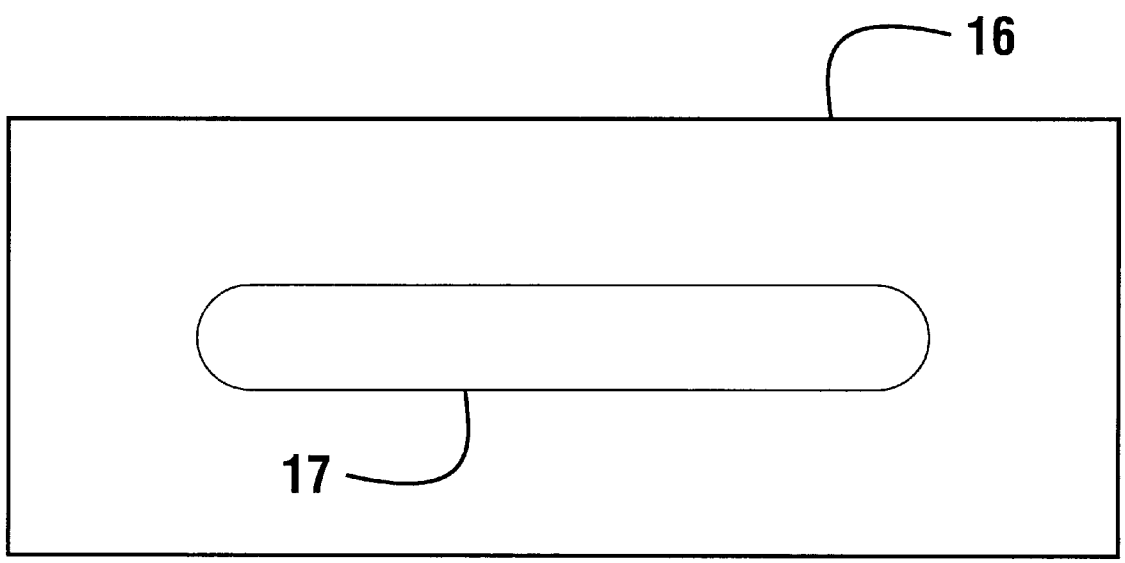
FIG. 2 is a bottom plan view of an aperture in the base of an electrical box.

Referring now to the drawings and particularly to FIG. 1, there is shown therein a typical electrical box assembly installation 10. A wireway 12 provides an enclosed passage within which are located a plurality of wires 14 for supplying electrical energy to electrical devices housed within electrical boxes 16. Wires 14 each have a bend 18 from wireway 12 to the point they enter an electrical box 16 through a bushing 20. Wires 14 enter electrical box 16 directly and straight in to their connection points. No additional space for bending wires 14 is required within electrical box 16. An aperture 17 through electrical box 16 is shown in FIG. 2. In the preferred form of the invention aperture 17 is oval or approximately oval in shape with two longer sides opposite each other and approximately parallel separated by two ends which are approximately parallel to each other.

Figure 3:
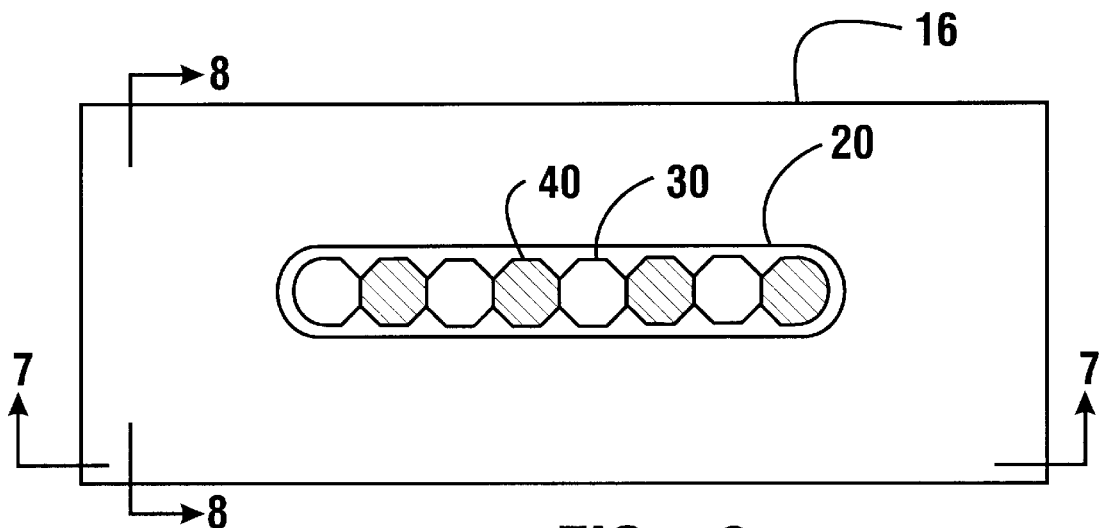
FIG. 3 is a bottom plan view of a bushing of the present invention in place in the base of an electrical box, and further showing a plurality of plugs installed in the bushing aperture.

As shown in FIG. 3 bushing 20 has a plurality of plugs 40 in attached relation therein. Interstices 30 are formed between plugs 40 and allow passage of wires 14 through bushing 20.

Figure 4:
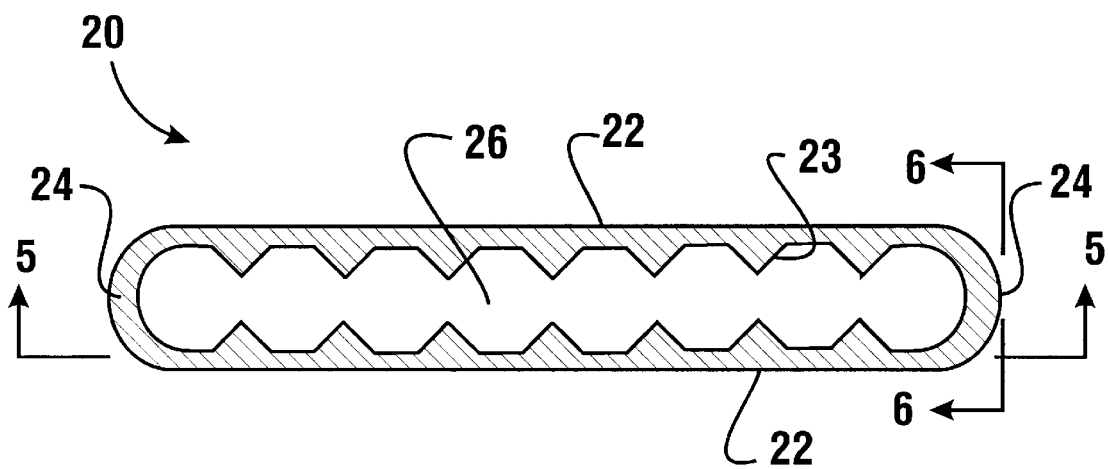
FIG. 4 is a plan view of the bushing of the present invention.

Bushing 20 in the preferred embodiment shown in FIG. 4 has first and second side walls 22 and first and second end walls 24. Side walls 22 are approximately parallel to each other and are disposed from each other and approximately perpendicular to end walls 24. End walls 24 are approximately parallel to each other and are disposed from each other and approximately perpendicular to side walls 22. In other embodiments bushing 20 may have more or fewer than two side walls 22 and end walls 24, which may be disposed relative to each other at suitable directions other than parallel and perpendicular. Side walls 22 and end walls 24 circumscribe a passage 26 within bushing 20. Side walls 22 have a plurality of tabs 23 projecting into passage 26. In the preferred embodiment as shown in FIG. 3, tabs 23 are generally triangular in shape. A tab 23 projects into passage 26 from a first side wall 22 toward a second side wall 22. From second side wall 22 a second tab 23 projects into aperture 26 toward first tab 23. Tabs 23 cooperate with plugs 40 to hold plugs 40 within aperture 26.

Bushing 20 may be made of any suitable material with sufficient flexibility to be inserted into an opening in electrical box 18 and with sufficient durability to withstand abrasion from wire movement during operational load cycling. In certain installations bushing 20 may be made of a fire-retardant material. Further, in certain installations it may be desirable for bushing 20 to have sufficient stiffness to secure wires 14 from movement under bolted-fault conditions.

Figure 5:
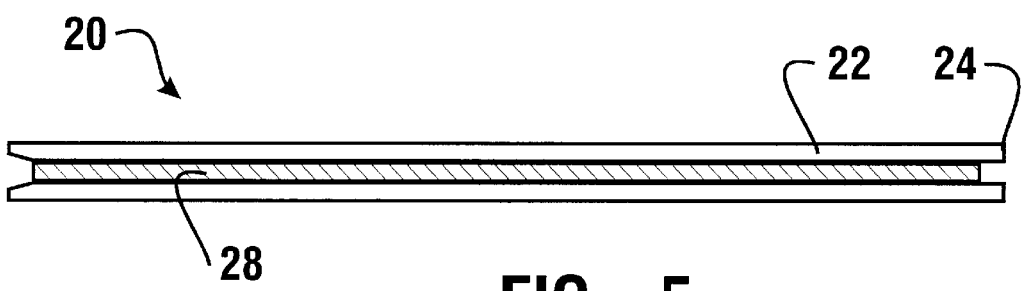
FIG. 5 is side elevation of the bushing of FIG. 4 taken along line 5—5.
Figure 6:
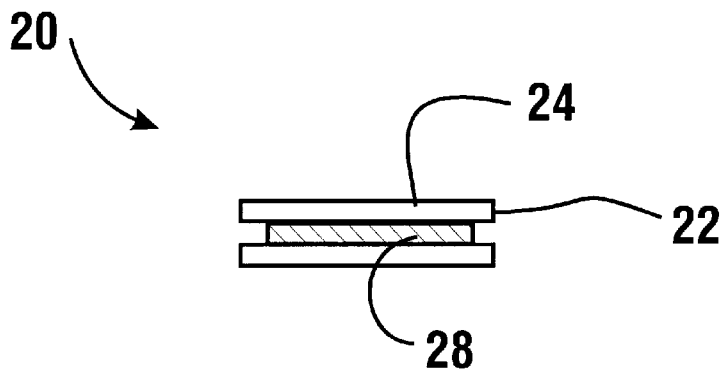
FIG. 6 is an end elevation of the bushing of FIG. 4 taken along line 6—6.
Figure 7:
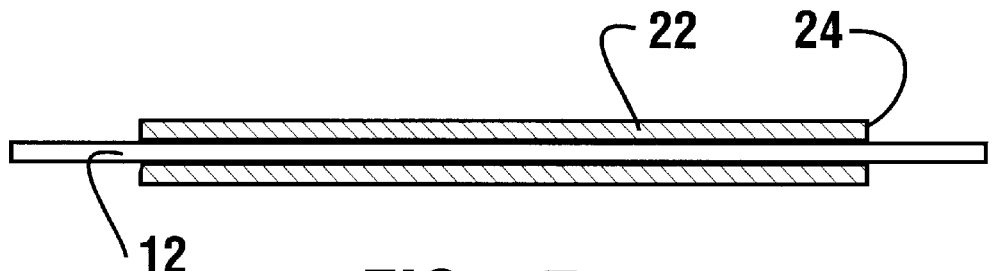
FIG. 7 is a side elevation of the bushing and electrical box base of FIG. 3 taken along line 7—7.
Figure 8:
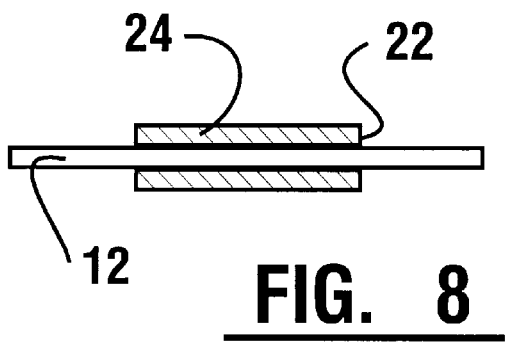
FIG. 8 is a side elevation of the bushing and electrical box base of FIG. 3 taken along line 8—8.

FIG. 5 is a side view of bushing 20. FIG. 6 is an end view of bushing 20. In this embodiment bushing 20 has around its perimeter a groove 28. Groove 28 has a shape and size suitable to engage the edges of an opening in an electrical box base 12 as is well known in the use of bushings. FIG. 7 is a side view of bushing 20 and FIG. 8 is an end view of bushing 20, each showing groove 28 engaging an edge of an opening in electrical box base 12. Groove 28 allows a friction fit. Alternatively a mechanical fastener may be used to hold the bushing in place in the box opening.

Interstices 30 are shown in FIG. 2 as octagonal in plan view and corresponding in size and shape to plugs 40 inserted to close up the segments of passage 26 not used for entry of wires. However, interstices 30 may be circular or any other suitable shape. They are sized to permit entry of wires 14 therethrough during installation and for movement during operational load cycling. For example, a 1/0 AWG 600 volt polyethylene insulated wire has a nominal outside diameter slightly less than ½ inch. An interstice 30 for this size wire should have a slightly smaller nominal diameter to allow a snug fit. Interstice 30 may also be sized for two or more wire sizes which have only slightly larger or smaller diameters.

Figure 9:
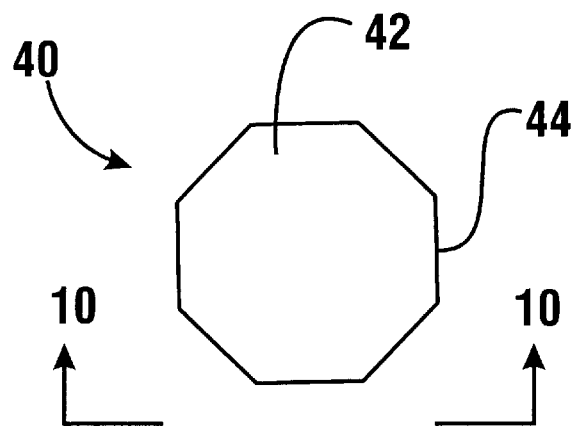
FIG. 9 is a plan view of a plug.
Figure 10:
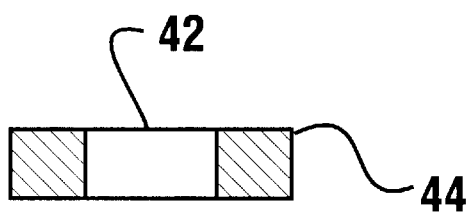
FIG. 10 is a side elevation of the plug of FIG. 9 taken along line 10—10.
Figure 11:
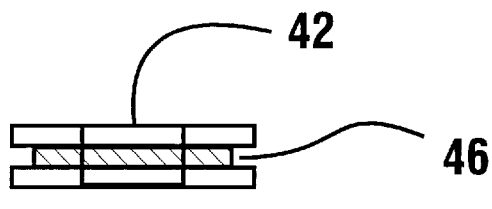
FIG. 11 is a side elevation of a first alternate embodiment of the plug of FIG. 9.
Figure 12:
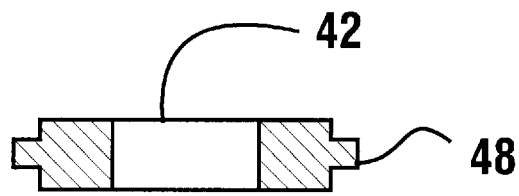
FIG. 12 is a side elevation of a second alternate embodiment of the plug of FIG. 7.

A plug 40 is shown in FIG. 9. Plugs 40 shown in FIGS. 2 and 9 are octagonal in plan view, but they may be circular or any other suitable shape. A plug 40 may have a straight sided wall 44 as shown in FIG. 10 for a friction fit within passage 26, or for attachment mechanically with a fastener or adhesive. Alternatively a plug 40 may have a groove 46 as shown in FIG. 11 to mate with a corresponding tongue in bushing 20 to form a tongue and groove joint for attachment within passage 26. As shown in FIG. 12, a plug 40 may have a tongue 48 to mate with a corresponding groove in bushing 20. It can be seen that a plug 40 with a groove 46 as shown in FIG. 11 may also be used directly in an aperture and without a bushing.

Plugs 40 may be removed and reinserted at different locations in passage 26 when changes in electrical devices within electrical box 16 require relocation of the entry point of wires 14.

It can be seen that the system and method of the present invention may also be used for wires passing through sections of electrical chassis or walls.

Thus the new apparatus and method of installation of electrical wiring of the present invention achieves the above stated objectives, eliminates difficulties encountered in the use of prior devices and systems, solves problems and attains the desirable results described herein.

In the foregoing description certain terms have been used for brevity, clarity and understanding, however, no unnecessary limitations are to be implied therefrom because such terms are for descriptive purposes and are intended to be broadly construed. Moreover, the descriptions and illustrations herein are by way of examples and the invention is not limited to the exact details shown and described.

In the following claims any feature described as a means for performing a function shall be construed as encompassing any means capable of performing the recited function, and shall not be limited to the structures shown herein or mere equivalents.

Having described the features, discoveries and principles of the invention, the manner in which it is constructed and operated, and the advantages and useful results attained, the new and useful structures, devices, elements, arrangements, parts, combinations, systems, equipment, operations and relationships are set forth in the appended claims.

I claim:

1. Electrical distribution box apparatus adapted to enclose electrical equipment wherein the electrical equipment is mechanically and electrically connected to electrical wires, the apparatus comprising:
    a box having an aperture therein through which wires pass; and
    a bushing in supported connection with the box and bounded by the aperture,
        wherein the bushing has a passage therein
        wherein the bushing comprises a wall,
            wherein the wall comprises a tab,
                the tab extending outwardly from the wall and inwardly into the passage.

2. The apparatus of claim 1 wherein the bushing is removably mounted in the aperture.

3. The apparatus of claim 2 and further comprising a plug bounded by the bushing, wherein the plug is in removably attachable connection with the bushing.

4. The apparatus of claim 1 wherein the wall constitutes a first wall and the tab constitutes a first tab, and further comprising a second wall and a second tab, wherein the first wall is opposite the second wall, and the second tab extending outwardly from the second wall and inwardly into the passage.

5. The apparatus of claim 4 wherein the perimeter of the aperture and the outer perimeter of the bushing are oval in shape.

6. The apparatus of claim 2 wherein the bushing has a groove therein, the groove bounding the aperture through the box.

7. Electrical distribution box apparatus adapted to enclose electrical equipment wherein the electrical equipment is mechanically and electrically connected to electrical wires, the apparatus comprising:
    a box having an aperture therein through which wires pass;
    an integral bushing in supported connection with the box and bounded by the aperture,
        wherein the bushing is removably mounted in the aperture,
        wherein the bushing has a passage therein,
        wherein the interior of the electrical box is accessible through the passage,
        wherein the bushing comprises a wall,
            wherein the wall comprises projections extending therefrom;
    a plurality of plugs,
        wherein the plugs are removably attachable with the bushing;
        wherein the bushing is adapted to receive the plurality of plugs in attachable relation therewith, and
        wherein the projections are adapted to cooperate in attachment of the plugs with the bushing.

8. The apparatus of claim 7 wherein the bushing has a groove therein, the groove bounding the aperture through the box.

9. The apparatus of claim 8 wherein the perimeter of the aperture and the outer perimeter of the bushing are oval in shape.

10. The apparatus of claim 7 wherein the plugs are bounded by the bushing.

11. Electrical distribution box apparatus adapted to enclose electrical equipment wherein the electrical equipment is mechanically and electrically connected to electrical wires, the apparatus comprising:
    a box having an aperture therein through which wires pass; and
    a bushing in supported connection with the box and bounded by the aperture,
        wherein the bushing is removably mounted in the aperture;
        wherein the bushing comprises first and second side walls and first and second end walls;
            wherein the first side wall is opposite the second side wall and the first end wall is opposite the second end wall;
        wherein the bushing has a passage therein, the passage bounded by the first and second side wall and the first and second end wall;
        wherein the bushing has a groove therein, the groove bounding the aperture through the box;
        wherein a side wall comprises a tab, the tab extending outwardly from a side wall and inwardly into the passage.

12. The apparatus of claim 11 wherein the tab constitutes a first tab, the first tab extending outwardly from the first side wall and inwardly into the passage, and further comprising a second tab, the second tab extending outwardly from the second side wall and inwardly into the passage.

13. The apparatus of claim 12 and further comprising a plug, wherein the plug is bounded by the tabs.

14. The apparatus of claim 13 wherein the plug is removably mounted in the passage.

15. The apparatus of claim 11 and further comprising a plug, wherein the plug is bounded by the tab.

16. The apparatus of claim 15 wherein the plug is removably mounted in the passage.

17. A method for mechanically and electrically connecting electrical equipment within an electrical distribution box to electrical wires entering the electrical distribution box, comprising the steps of:

making an aperture in the electrical distribution box; and placing an integral bushing in removably supported connection with the electrical distribution box, wherein the bushing is bounded by the aperture, wherein the bushing has a passage therein, wherein the bushing comprises a wall having projections extending therefrom, wherein the bushing is adapted to receive a plurality of plugs in attachable relation therewith, whereby the interior of the electrical box is accessible through the passage;

passing electrical wire through the bushing to the electrical equipment; and placing a plurality of plugs in removably attachable connection with the bushing, whereby the projections cooperate in attaching the plugs with the bushing.

18. The method of claim 17 wherein the step of placing the bushing further comprises placing a bushing having first and second side walls and first and second end walls, wherein the first side wall is opposite the second side wall and the first end wall is opposite the second end wall, and wherein the bushing has a groove therein bounding the aperture.

19. A method for mechanically and electrically connecting electrical equipment within an electrical distribution box to electrical wires entering the electrical distribution box, comprising the steps of:

making an aperture in the electrical distribution box; and placing a bushing in removably supported connection with the electrical distribution box, wherein the bushing is bounded by the aperture, wherein the bushing has a passage therein, wherein the bushing comprises a wall, wherein the wall comprises a tab extending outwardly from the wall and inwardly into the passage, whereby the interior of the electrical box is accessible through the bushing; and passing electrical ware through the bushing to the electrical equipment.

20. The method of claim 19 wherein the step of placing the bushing further comprises placing a bushing having a groove therein bounding the aperture.

21. The method of claim 19 wherein the step of placing the bushing further comprises placing a bushing having first and second side walls and first and second end walls, wherein the first side wall comprises the tab and is opposite the second side wall and the first end wall is opposite the second end wall, and wherein the second side wall comprises an additional tab extending outwardly from the second side wall and inwardly into the passage.

* * * * *